US008407301B1

(12) United States Patent
Pendharkar

(10) Patent No.: US 8,407,301 B1
(45) Date of Patent: Mar. 26, 2013

(54) SYSTEMS AND METHODS FOR CREATING INCREMENTAL IMAGES OF CLUSTER VOLUMES

(75) Inventor: Niranjan Pendharkar, NCL (IN)

(73) Assignee: Symantec Corporation, Mountain View, CA (US)

( * ) Notice: Subject to any disclaimer, the term of this patent is extended or adjusted under 35 U.S.C. 154(b) by 487 days.

(21) Appl. No.: 12/717,071

(22) Filed: Mar. 3, 2010

(51) Int. Cl.
G06F 15/16 (2006.01)

(52) U.S. Cl. ........ 709/206; 709/224; 709/225; 709/228; 709/226; 709/218; 709/219; 710/31; 710/5; 710/1; 710/9; 710/33

(58) Field of Classification Search .................. 709/206, 709/218, 223–228, 219, 212
See application file for complete search history.

(56) References Cited

U.S. PATENT DOCUMENTS

| 7,340,640 B1 * | 3/2008 | Karr et al. ..................... 714/6.23 |
| 7,386,662 B1 * | 6/2008 | Kekre et al. ................... 711/113 |
| 7,389,394 B1 * | 6/2008 | Karr et al. ..................... 711/162 |
| 7,424,592 B1 * | 9/2008 | Karr et al. ..................... 711/203 |
| 7,523,139 B1 * | 4/2009 | Kemkar et al. ................... 1/1 |
| 7,636,801 B1 * | 12/2009 | Kekre et al. ..................... 710/31 |

* cited by examiner

Primary Examiner — Jude Jean Gilles
(74) Attorney, Agent, or Firm — ALG Intellectual Property, LLC

(57) ABSTRACT

A computer-implemented method for creating incremental images of cluster volumes. The method may include 1) maintaining a parallel cluster comprising a plurality of cluster nodes connected to a cluster volume; 2) creating a first incremental image of the cluster volume by capturing changes to the cluster volume on a first mirror during a first period of time; 3) for each cluster node in the parallel cluster, blocking write completions for writes to the cluster volume; 4) while the write completions are blocked, switching to a second mirror to create a second incremental image of the cluster volume by capturing changes to the cluster volume on the second mirror during a second period of time; and 5) after switching to the second mirror, unblocking the write completions for writes to the cluster volume. Various other methods, systems, and computer-readable media are also disclosed.

20 Claims, 5 Drawing Sheets

SYSTEMS AND METHODS FOR CREATING INCREMENTAL IMAGES OF CLUSTER VOLUMES

BACKGROUND

In the digital age, organizations increasingly depend on a variety of data protection functions (e.g., backups, data replication, etc.) to protect and preserve their data. These organizations may operate under a variety of constraints (financial, technical, institutional, legal, etc.) which may increase their need for efficient implementation of their data protection solutions.

Traditional data protection solutions have implemented a variety of techniques to reduce overhead. For example, backup systems may take incremental backups by only capturing blocks that have changed since a previous incremental or full backup. Incremental backups may be smaller and faster to take than full backups and may therefore reduce data protection overhead.

Unfortunately, despite improvements in data protection technologies, volume level backup and replication solutions in cluster environments may still require significant overhead. For example, to meet a Recovery Point Objective ("RPO"), an enterprise may require cluster volume data to be backed up every ten minutes. The enterprise may use incremental backups to comply with the RPO, which is typically more efficient than taking full backups at each time increment. However, taking frequent incremental backups may still result in unacceptable overhead costs.

For example, in parallel cluster environments (i.e., environments where an application executes in parallel on multiple cluster nodes), traditional backup solutions may quiesce application Input/Output ("I/O") during incremental backups to maintain consistency in the incremental backups. Frequent quiescing of application I/O may result in substantial performance degradation for the application and may be unacceptable to users. What is needed, therefore, is a more efficient and effective mechanism to provide data protection in parallel cluster environments.

SUMMARY

As will be described in greater detail below, the instant disclosure generally relates to systems and methods for creating incremental images of cluster volumes. For example, a computer-implemented method for creating incremental images of cluster volumes may include: 1) maintaining a parallel cluster comprising a plurality of cluster nodes connected to a cluster volume; 2) creating a first incremental image of the cluster volume by capturing changes to the cluster volume on a first mirror during a first period of time; 3) for each cluster node in the parallel cluster, blocking write completions for writes to the cluster volume; 4) while the write completions are blocked, switching to a second mirror to create a second incremental image of the cluster volume by capturing changes to the cluster volume on the second mirror during a second period of time; and 5) after switching to the second mirror, unblocking the write completions for writes to the cluster volume.

In various embodiments, maintaining the parallel cluster may include selecting a first node in the parallel cluster as a master node, configuring the master node to manage switching between the first and second mirrors, and designating a second node in the parallel cluster as a slave node. In such embodiments, blocking write completions for writes to the cluster volume may include configuring the master node to block write completions, sending a message from the master node to the slave node requesting that the slave node configure itself to block write completions, and receiving a message from the slave node indicating that the slave node is configured to block write completions. In some embodiments, switching to a second mirror to create a second incremental image of the cluster volume may include switching the master node to the second mirror and sending a message from the master node to the slave node requesting that the slave node switches to the second mirror. Similarly, unblocking the write completions for writes to the cluster volume may include unblocking write completions for writes from the master node to the cluster volume and sending a message from the master node to the slave node requesting that the slave node unblocks write completions for writes to the cluster volume.

According to certain embodiments, switching to the second mirror may include selecting the second mirror from a plurality of available mirrors. In such embodiments, the master node may select the second mirror from the plurality of available mirrors and may send a message to the slave node indicating that the slave node should switch from the first mirror to the second mirror.

In at least one embodiment, switching to the second mirror includes periodically switching between the first and second mirrors to provide continuous incremental images of the cluster volume. According to some embodiments, the first and second periods of time may be fixed intervals of time. Additionally or alternatively, switching to the second mirror is triggered when the first mirror captures a predefined amount of data. Switching to the second mirror may also be triggered by a command received from a process external to the parallel cluster.

In some embodiments, the method may include capturing offset and length information for each write submitted to the first mirror. In such embodiments, the method may include, after switching to the second mirror, using the length and offset information to read the first incremental image from the first mirror and using the first incremental image to provide an incremental backup and/or incremental replication of the cluster volume. According to certain embodiments, at least one of the first and second mirrors may include storage space provisioned by a thin-provisioned array.

In some embodiments, a system for creating incremental images of cluster volumes may include: 1) a cluster agent programmed to maintain a parallel cluster comprising a plurality of cluster nodes connected to a cluster volume; 2) a mirroring module programmed to create a first incremental image of the cluster volume by capturing changes to the cluster volume on a first mirror during a first period of time and programmed to switch to a second mirror to create a second incremental image of the cluster volume by capturing changes to the cluster volume on the second mirror during a second period of time; 3) a consistency module programmed to, for each cluster node in the parallel cluster, block write completions for writes to the cluster volume before the mirroring module switches to the second mirror and unblock the write completions for writes to the cluster volume after the mirroring module switches to the second mirror.

In some embodiments, the cluster agent may be programmed to maintain the parallel cluster by selecting a first node in the parallel cluster as a master node, configuring the master node to manage switching between the first and second mirrors, and designating a second node in the parallel cluster as a slave node. Additionally, the consistency module may be programmed to block write completions for writes to the cluster volume by configuring the master node to block write completions, sending a message from the master node to the slave node requesting that the slave node configures itself to block write completions, and receiving a message from the slave node indicating that the slave node is configured to block write completions.

In some embodiments, the mirroring module may be programmed to switch to the second mirror to create a second incremental image of the cluster volume by switching the master node to the second mirror and sending a message from the master node to the slave node requesting that the slave node switches to the second mirror, and the consistency module may be programmed to unblock the write completions for writes to the cluster volume by unblocking write completions for writes from the master node to the cluster volume and sending a message from the master node to the slave node requesting that the slave node unblocks write completions for writes to the cluster volume.

According to various embodiments, at least one of the first and second mirrors may include storage space provisioned by a thin-provisioned array. In certain embodiments, the system may include a backup module programmed to use the first incremental image of the volume to provide an incremental backup of the cluster volume and/or a replication module programmed to use the first incremental image to provide an incremental replication of the cluster volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
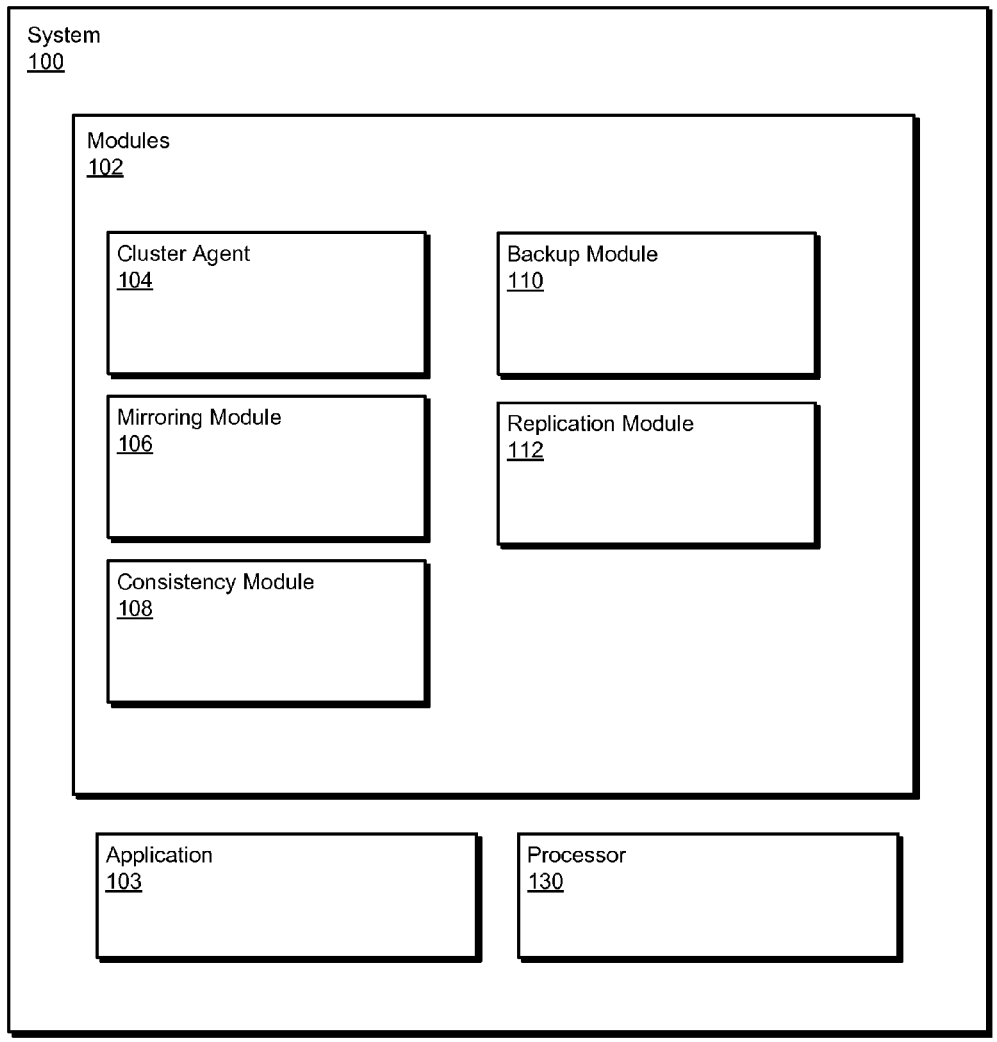
FIG. 1 is a block diagram of an exemplary system for creating incremental images of cluster volumes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for creating incremental images of cluster volumes. For example, systems of the instant disclosure may efficiently and effectively take incremental images of cluster volumes in parallel cluster environments by switching between two or more mirrors to capture changes to cluster volumes. Such systems may maintain consistency for the incremental images by implementing a consistency protocol that blocks write completions while mirrors are being switched and unblocks write completions after mirrors are switched. As discussed in greater detail below, these and other features of embodiments disclosed herein may result in relatively low overhead for volume backups and replications and/or may provide various other advantages.

Figure 2:
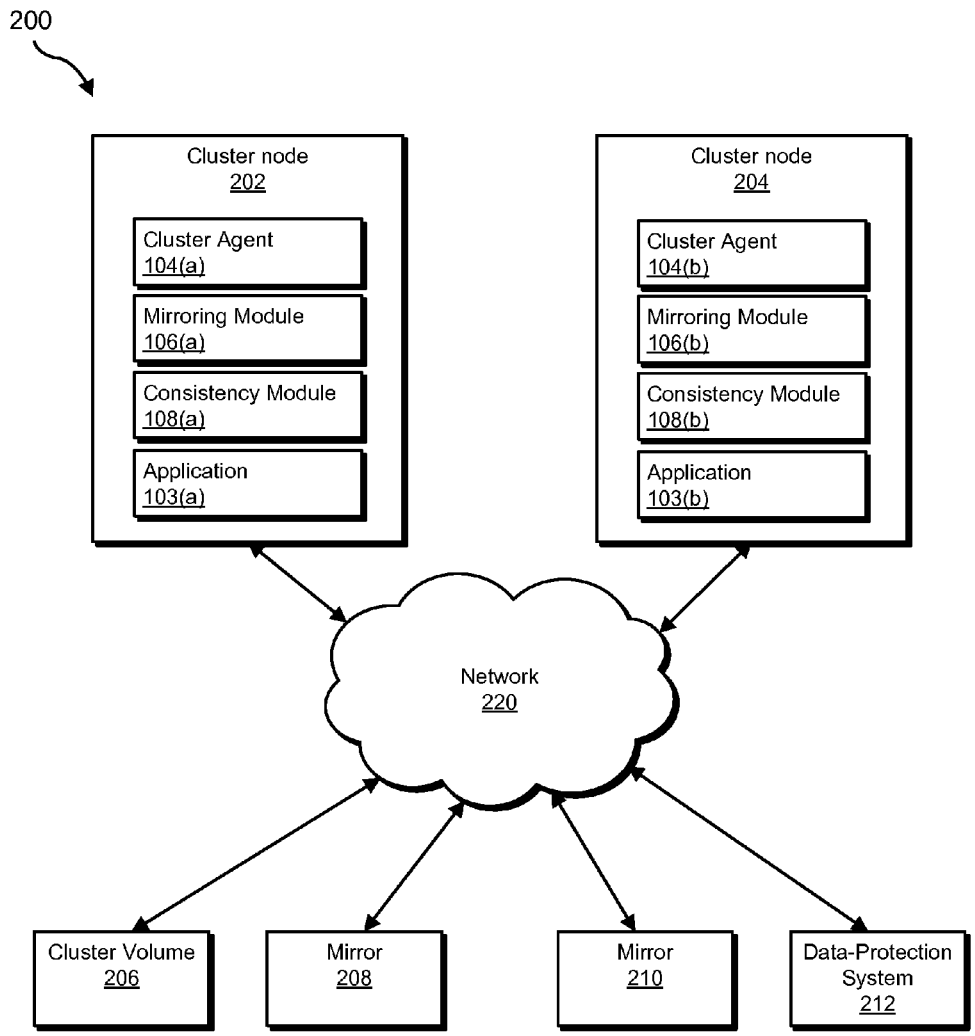
FIG. 2 is a block diagram of another exemplary system for creating incremental images of cluster volumes.

The following will provide, with reference to FIGS. 1-2, detailed descriptions of exemplary systems for creating incremental images of cluster volumes. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for creating incremental images of cluster volumes. As illustrated in this figure, exemplary system 100 may include one or more modules 102 for performing one or more tasks. For example, and as will be explained in greater detail below, exemplary system 100 may include a cluster agent 104 programmed to maintain a parallel cluster (i.e., a cluster of nodes supporting an application that is distributed across the nodes) comprising a plurality of cluster nodes connected to a cluster volume. Exemplary system 100 may also include a mirroring module 106 programmed to create a first incremental image of the cluster volume by capturing changes to the cluster volume on a first mirror during a first period of time. Mirroring module 106 may also be programmed to switch to a second mirror to create a second incremental image of the cluster volume by capturing changes to the cluster volume on the second mirror during a second period of time.

As shown in FIG. 1, system 100 may include a consistency module 108 programmed to, for each cluster node in the parallel cluster, block write completions for writes to the cluster volume before the mirroring module switches to the second mirror and unblock the write completions for writes to the cluster volume after the mirroring module switches to the second mirror. System 100 may also include a backup module 110 programmed to use incremental images captured on mirrors to provide incremental backups. System 100 may further include a replication module 112 programmed to use incremental images captured on mirrors to provide incremental replications.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., cluster node 202 and/or cluster node 204), computing system 410 in FIG. 4, and/or portions of exemplary network architecture 500 in FIG. 5. One or more of modules 102 in FIG. 1 may also represent all or portions of one or more special-purpose computers (e.g., cluster servers) configured to perform one or more tasks.

As shown, system 100 may include an application 103. Application 103 generally represents any type of application configured to execute in a parallel cluster environment. System 100 may also include a processor 130, which may be configured to execute cluster agent 104, mirroring module 106, consistency module 108, backup module 110, and/or replication module 112. Processor 130 generally represents any device capable of executing code, such as processor 414 in FIG. 4.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include cluster nodes 202 and 204. Cluster nodes 202 and 204 generally represent any type or form of computing device capable of reading computer-executable instructions. Examples of cluster nodes include, without limitation, laptops, desktops, servers, virtual machines, embedded systems, combinations of one or more of the same, exemplary computing system 410 in FIG. 4, or any other suitable computing device or system.

As shown in FIG. 2, cluster node 202 may include a cluster agent 104(a), a mirroring module 106(a), a consistency module 108(a), and an application 103(a). Similarly, cluster node 204 may include a cluster agent 104(b), a mirroring module 106(b), a consistency module 108(b), and an application 103(b).

In the example shown in FIG. 2, cluster nodes 202 and 204 may represent a cluster. As used herein, the term "cluster node" generally refers to any computing device that is part of a cluster of linked computing devices. While FIG. 2 shows a two-node cluster, embodiments of the instant disclosure may apply to clusters with three or more nodes.

Embodiments of the instant disclosure are directed to parallel clusters. As used herein, the phrase "parallel cluster" generally refers to any cluster running a single application in parallel on two or more cluster nodes. Parallel clusters may provide an application with additional computational power and/or other resources by distributing the application among two or more cluster nodes. As shown in FIG. 2, cluster nodes 202 and 204 may include application 103(a) and application 103(b), which represent portions of application 203 being distributed between cluster nodes 202 and 204.

Any suitable type of application may run on cluster nodes 202 and 204. In some embodiments, an application capable of running in a parallel cluster may be designed to call cluster Application Programming Interfaces ("APIs"), may be capable of maintaining a cluster heartbeat between nodes, may be capable of transaction processing, may be capable of mirroring cluster information in real-time, and/or may be capable of changing its configuration data path.

Cluster nodes 202 and 204 may be connected to a cluster volume 206. Cluster volume 206 generally represents any type or form of computing device (e.g., a production Logical Unit Number ("LUN")) that is capable of communicating with cluster nodes and providing storage for a cluster. While FIG. 2 only shows a single cluster volume, nodes of a cluster may be connected to a set of cluster volumes that includes any number of cluster volumes. A set of volumes written to by a clustered application may be referred to herein as a consistency group, as discussed in greater detail below.

System 200 may also include mirrors 208 and 210. Mirrors 208 and 210 may be configured to mirror changes to data on cluster volume 206. Cluster nodes 202 and 204 may switch between mirrors 208 and 210 to capture incremental images of changes made to cluster volume 206. In some embodiments, more than two mirrors may be used to capture changes made to cluster volume 206. As used herein, the term "mirror" generally refers to any storage system for storing replicated data of a volume. Mirrors may be provisioned from any suitable storage device or system, including thin-provisioned arrays. Building mirrors out of thin provisioned LUNs may save storage space because space for the mirrors may be provisioned on-the-fly.

System 200 may also include a data protection system 212. Data protection system 212 may include backup module 110 and/or replication module 112. Thus, data protection system 212 may include a backup appliance and/or a replication appliance. Data protection system 212 may also provide any other type of data protection service.

Cluster node 202, cluster node 204, cluster volume 206, mirror 208, mirror 210, and data-protection system 212 may communicate over network 220. Network 220 generally represents any medium or architecture capable of facilitating communication or data transfer. Examples of network 220 include, without limitation, an intranet, a Wide Area Network ("WAN"), a Local Area Network ("LAN"), a Personal Area Network ("PAN"), the Internet, a Storage Area Network ("SAN"), Power Line Communications ("PLC"), a cellular network (e.g., a GSM Network), exemplary network architecture 500 in FIG. 5, or the like. Network 220 may facilitate communication or data transfer using wireless or wired connections.

In some embodiments, all or a portion of exemplary system 200 may be implemented in a virtual environment. For example, cluster nodes 202 and 204 may be implemented as virtual machines running as guest systems on two different host systems (i.e., physical machines with virtualization software). In a second example, cluster node 202 may run directly on a physical host system while cluster node 204 runs as a guest system on the same host system. As a third example, both cluster nodes 202 and 204 may run as guest systems on a single host system.

Figure 3:
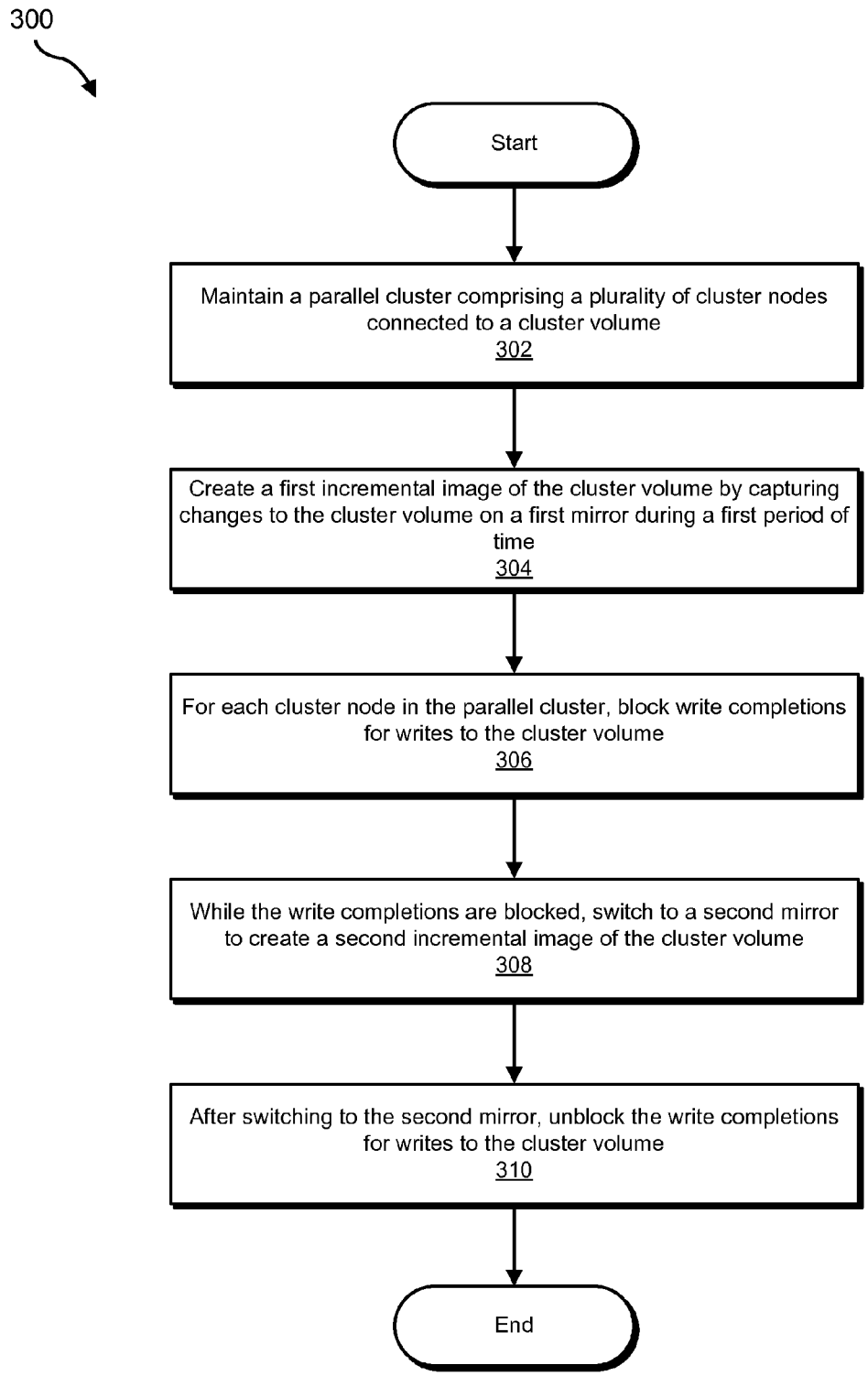
FIG. 3 is a flow diagram of an exemplary method for creating incremental images of cluster volumes.

FIG. 3 is a flow diagram of an exemplary computer-implemented method 300 for creating incremental images of cluster volumes. The steps shown in FIG. 3 may be performed by any suitable computer-executable code and/or computing system. At step 302 in FIG. 3, one or more of the systems described herein may maintain a parallel cluster comprising a plurality of cluster nodes connected to a cluster volume. For example, cluster agent 104 in FIG. 1 (which may, as detailed above, represent a portion of cluster node 202 and/or cluster node 204 in FIG. 2) may maintain a parallel cluster comprising cluster nodes 202 and 204 connected to a cluster volume 206.

Cluster agent 104 may maintain the parallel cluster in any suitable manner. For example, cluster agent 104, which is represented in FIG. 2 as cluster agent 104(a) and cluster agent 104(b), may perform one or more cluster management tasks for cluster node 202 and/or cluster node 204. Cluster agents 104(a) and 104(b) may manage communications between cluster nodes. Cluster agents 104(a) and 104(b) may communicate their status to each other with a heartbeat. A heartbeat sent from cluster node 202 to cluster node 204 may inform cluster node 204 of actions taking place and the status of all resources on cluster node 202. This cluster communication may take place over a private, dedicated network between cluster nodes. Cluster nodes 202 and 204 may use a communication package that includes Low Latency Transport ("LLT") and/or Group membership/Atomic Broadcast ("GAB").

In some embodiments, cluster agent 104 may select a first node in the cluster as a master node and may configure the master node to manage switching between mirrors. In such embodiments, cluster agent 104 may designate a second node and possibly other nodes in the cluster as slave nodes. Communications between master and slave nodes are discussed in greater detail below.

Cluster agents 104(a) and 104(b) may provide parallel execution for an application, such as application 103. As described in subsequent steps, writes from application 103 may be captured as incremental images by rotating between mirrors 208 and 210. Since the writes may originate from different nodes but from the same application, the incremental images may be inconsistent if steps are not taken to ensure consistency.

As an example that illustrates the problem of maintaining consistency, application 103(a) may be programmed to issue a first write to cluster volume 206, and application 103(b) may be programmed to issue a second write that is dependent on the first write (e.g., the second write may overwrite a block of data accessed by the first write). Thus, application 103(b) may wait until the first write completes to issue the second write. However, when mirroring modules 106(a) and 106(b) are instructed to switch from mirror 208 to mirror 210, mirroring module 106(a) may switch to mirror 210 before the first write is performed and mirroring module 106(b) may switch to mirror 210 after the second write is performed. As a result, the incremental image on mirror 208 (i.e., the first incremental image) may include the data of the second write, while the incremental image on mirror 210 (i.e., the second incremental image) may include the data of the first write. This inconsistency is unacceptable for data protection purposes. The following steps of method 300 show how embodiments of the instant disclosure prevent such inconsistencies in an efficient and effective manner.

At step 304 in FIG. 3, one more of the systems described herein may create a first incremental image of the cluster volume by capturing changes to the cluster volume on a first mirror during a first period of time. For example, mirroring module 106 in FIG. 1 (which may, as detailed above, represent a portion of cluster node 202 and/or cluster node 204 in FIG. 2) may create an incremental image of cluster volume 206 by capturing changes to cluster volume 206 on mirror 208 during a first period of time.

Changes (i.e., writes, deletions, etc.) to cluster volumes may be captured in mirrors in any suitable way using any suitable mirroring technology. For example, mirroring modules 106(a) and 106(b) may include splitter drivers than send writes directed to cluster volume 206 to both cluster volume 206 and a mirror.

Typically, in embodiments of the present disclosure, mirrors 208 and 210 do not represent complete duplicates of cluster volume 206. Instead, mirrors 208 and 210 may capture incremental images that represent changes to cluster volume 206 for a specific time interval. Thus, when connecting cluster nodes 202 and 204 to mirrors 208 and 210, mirroring modules 106(a) and 106(b) may not initiate synchronization with cluster volume 206.

The incremental images captured by mirrors 208 and 210 may be created for time periods of various durations. For example, the time increments for incremental images captured by mirrors 208 and 210 may be on the order of minutes, hours, days, or any other suitable length of time.

In one example, mirror 208 may capture changes to cluster volume 206 from cluster node 202 and/or 204 during a first period of time. In embodiments where a cluster contains more than two clusters nodes, mirror 208 may capture changes to cluster volume 206 from all of the cluster nodes. Similarly, if the nodes of a cluster are connected to multiple volumes, mirrors may be provisioned for each volume to capture changes to the volume. For example, each volume may be associated with two or more mirrors configured to capture incremental images for that particular volume.

Cluster nodes 202 and 204 may capture offset and length information (also referred to herein as meta-information) for each write submitted to mirror 208. In some embodiments, the meta-information collected by each mirror may be consolidated. The meta-information may be used to read the exact data captured as an incremental image by mirror 208.

At step 306 in FIG. 3, one or more of the systems described herein may, for each cluster node in the parallel cluster, block write completions for writes to the cluster volume. For example, consistency module 108(a) and/or 108(b) may block write completions for writes to cluster volume 206. When blocking write completions, new writes may be allowed to go through to cluster volume 206 from cluster nodes, but completion of the writes may be blocked at cluster nodes 202 and 204.

Write completions may be blocked in any suitable manner. For example, write completions may be blocked by setting a "block I/O completion for all writes" state on cluster node 202 and cluster node 204. Thus, when cluster volume 206 responds to a write to confirm that the write occurred on cluster volume 206, cluster nodes 202 and/or 204 may block application 103(a) and/or 103(b) from receiving the write completion confirmation until write completions are unblocked.

At step 308 in FIG. 3, one or more of the systems described herein may, while the write completions are blocked, switch to a second mirror to create a second incremental image of the cluster volume by capturing changes to the cluster volume on the second mirror during a second period of time. For example, cluster nodes 202 and 204 may, while write completions are blocked, switch mirroring from mirror 208 to mirror 210.

Switching from the first mirror to the second mirror may be triggered in a variety of ways. For example, the first and second periods of time may be fixed intervals of time, and switching may occur when a time interval ends. Time intervals for switching between mirrors may be set by default or may be user-defined. Additionally or alternatively, switching to the second mirror may be triggered when the first mirror captures a predefined amount of data. For example, if the predefined amount of data is 1 GigaByte ("GB"), a cluster node may switch to a second mirror once the first mirror captures 1 GB of data. The amount of data captured by a mirror may be calculated using meta-information (e.g., length and offset information) that cluster nodes capture for each write to a mirror.

In some embodiments, switching to the second mirror may be triggered by a command received from a process external to the parallel cluster. For example, a process on an external device or system may send a command to the cluster requesting that the cluster switch from the first mirror to the second mirror. Alternatively, a process on a server that hosts a cluster node but that is not part of the cluster may send a command to the cluster requesting that the cluster switch from the first mirror to the second mirror. In other embodiments, a process that receives input from users may receive a user request to switch to the second mirror and may then send a command to the cluster requesting the switch to the second mirror.

An external process that triggers switching between mirrors may provide additional information that is associated with an incremental image captured on a mirror. For example, when an external process sends a command to switch from a first mirror to a second mirror, the external process may also send information that is to be associated with the incremental image on the first mirror. Thus, an entity that reads the incremental image from the first mirror may also read the additional information associated with the incremental image. In some embodiments, the additional information may prompt the entity that reads the incremental image to perform one or more actions.

At step 310 in FIG. 3, after switching to the second mirror, one or more of the systems described herein may unblock the write completions for writes to the cluster volume. For example, consistency module 108(a) and/or consistency module 108(b) may unblock write completions for writes to cluster volume 206. Write completions may be unblocked in a variety of ways. In some embodiments, write completions may be unblocked by clearing a "block I/O completion for all writes" state on cluster node 202 and cluster node 204.

The process presented in FIG. 3 may be repeated for sequential periods of time to provide consistent incremental images for a cluster volume. For example, mirror 208 may capture changes to cluster volume 206 during a first interval. Mirror 210 may capture changes to cluster volume 206 during a second interval after the first interval, and during the second interval the changes captured by mirror 208 during the first interval may be used to create an incremental backup and/or an incremental replication. For example, cluster node 202, cluster node 204, and/or any other server (e.g., a server that is not a part of the cluster) may read the data from mirror 208. An entity (whether external or internal to the cluster) that reads the data from mirror 208 may be referred to as a "consumer."

Meta-information collected by the cluster nodes for writes done to mirror 208 may be used by a consumer to read the data from mirror 208. In embodiments where a server external to the cluster reads the mirrored data, the meta-information may be transferred to the external server and mirror 208 may be connected to the external server (e.g., using network-based attached, direct attach, etc.). After mirror 208 has been read by a consumer, the consumer may mark mirror 208 as being available so that mirror 208 may be used to capture a future incremental image. The consumer may use the incremental image read from mirror 208 to provide incremental replication and/or backup for cluster volume 206.

After becoming available, mirror 208 may be used to capture changes to cluster volume 206 during a third interval, during which the changes captured by mirror 210 may be read and used to create an incremental backup and/or an incremental replication. The process may continue to rotate between mirrors 208 and 210 to provide continuous, consistent images of changes made to cluster volume 206. For example, the process illustrated in FIG. 3 may provide continuous data protection for a cluster volume. While the previous example discusses rotating between two mirrors, in some embodiments, this process may be implemented by rotating through three or more mirrors.

As previously noted, in certain embodiments one cluster node may be designated as a master and one or more other cluster nodes may be designated as slaves. In such embodiments, the master node may send a message to all slave nodes requesting that the slave nodes block write completion for all volumes being written to by an application (i.e., a consistency group of volumes).

After receiving this message from the master node, the slave nodes may block write completions for all volumes in the consistency group. The master node may also block write completions for all volumes in the consistency group. The slave nodes may respond to the master node confirming that write completions are blocked. After confirming that write completions are blocked on each node in the cluster, the master node may select a second mirror for capturing writes during the next capture interval. At this point, there may be no dependent writes in the cluster.

The master node may send another message to all the slave nodes requesting that the slave nodes switch from a first mirror to the second mirror to capture changes to volumes in the consistency group. In embodiments where more than two mirrors are available for each volume in the consistency group, the master node may select the second mirror from a plurality of mirrors and tell the slave nodes to connect to the selected mirror.

Upon receiving this message, the slave nodes may switch to the second mirror for capturing changes to volumes in the consistency group. The master node may also switch to the second mirror. The slave nodes may send a message to the master node confirming that mirrors have been switched. At this point, the master node may send another message to the slave nodes requesting that the slave nodes unblock write completions. The slave nodes may unblock write completions and send confirmations to the master node. The master node may also unblock write completions.

This process may result in capturing consistent incremental images of changes made to volumes from cluster nodes of a clustered application. Since embodiments of the instant disclosure may not quiesce I/O for cluster volumes while switching between mirrors, embodiments of the instant disclosure may not cause the performance degradation that results from periodically quiescing I/O. Thus, the instant disclosure provides for efficient creation of incremental images for cluster environments.

Figure 4:
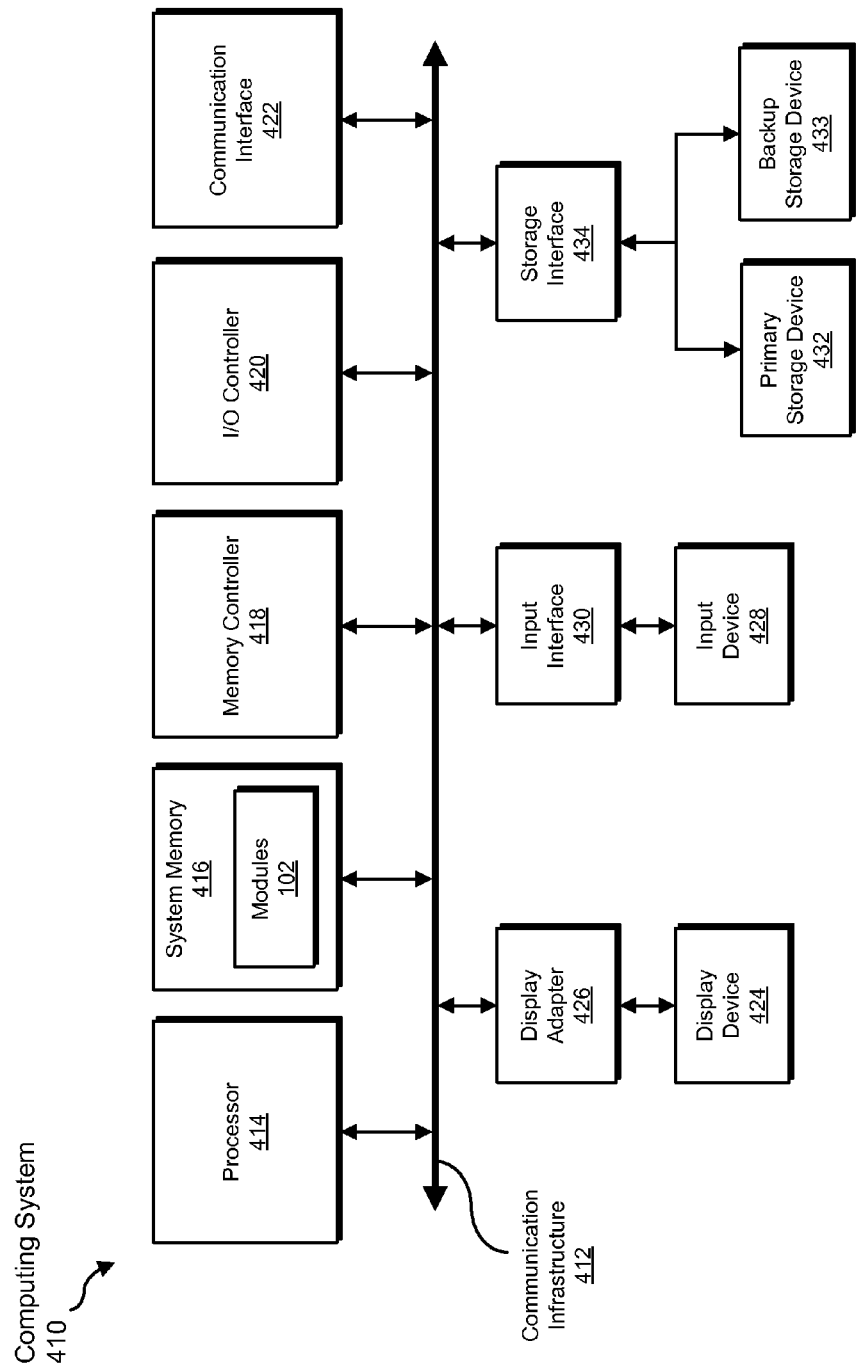
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the maintaining, creating, blocking, switching, capturing, unblocking, selecting, configuring, designating, sending, and/or receiving steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as maintaining, creating, blocking, switching, capturing, unblocking, selecting, configuring, designating, sending, and/or receiving.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the maintaining, creating, blocking, switching, capturing, unblocking, selecting, configuring, designating, sending, and/or receiving steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the maintaining, creating, blocking, switching, capturing, unblocking, selecting, configuring, designating, sending, and/or receiving steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the maintaining, creating, blocking, switching, capturing, unblocking, selecting, configuring, designating, sending, and/or receiving steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the maintaining, creating, blocking, switching, capturing, unblocking, selecting, configuring, designating, sending, and/or receiving steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
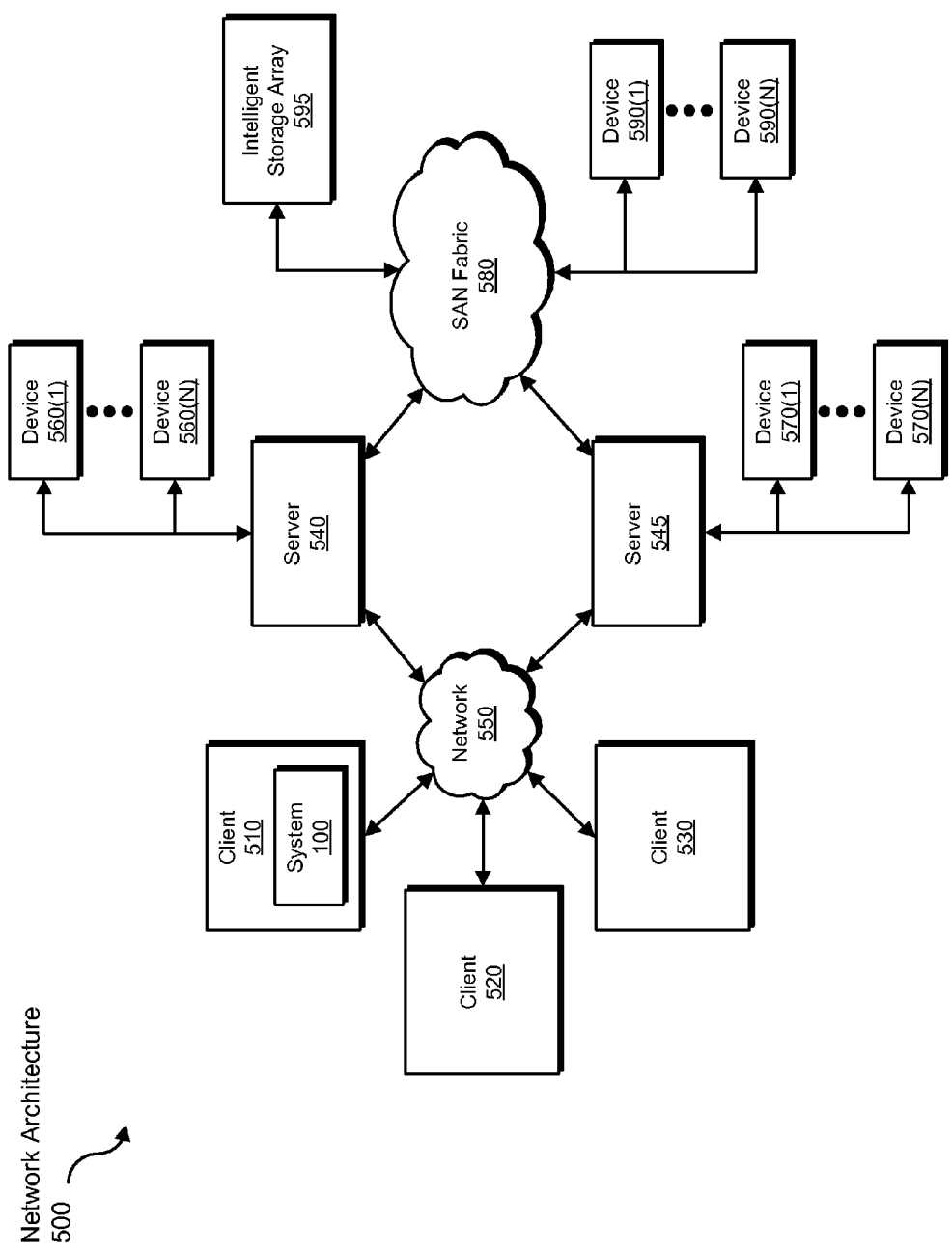
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the maintaining, creating, blocking, switching, capturing, unblocking, selecting, configuring, designating, sending, and/or receiving steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for creating incremental images of cluster volumes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a storage system into an incremental image of a cluster volume by capturing changes to the storage system during a first time period.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating incremental images of cluster volumes, at least a portion of the method being performed by a computing device comprising at least one processor, the method comprising:
    maintaining a parallel cluster comprising a plurality of cluster nodes connected to a cluster volume;
    creating a first incremental image of the cluster volume by capturing changes to the cluster volume on a first mirror during a first period of time;
    for each cluster node in the parallel cluster, blocking write completions for writes to the cluster volume;
    while the write completions are blocked, switching to a second mirror to create a second incremental image of the cluster volume by capturing changes to the cluster volume on the second mirror during a second period of time;
    after switching to the second mirror, unblocking the write completions for writes to the cluster volume.

2. The method of claim 1, wherein maintaining the parallel cluster comprises:
    selecting a first node in the parallel cluster as a master node;
    configuring the master node to manage switching between the first and second mirrors;
    designating a second node in the parallel cluster as a slave node.

3. The method of claim 2, wherein blocking write completions for writes to the cluster volume comprises:
    configuring the master node to block write completions;
    sending a message from the master node to the slave node requesting that the slave node configures itself to block write completions;
    receiving a message from the slave node indicating that the slave node is configured to block write completions.

4. The method of claim 2, wherein:
    switching to a second mirror to create a second incremental image of the cluster volume comprises:
        switching the master node to the second mirror;
        sending a message from the master node to the slave node requesting that the slave node switches to the second mirror;
    unblocking the write completions for writes to the cluster volume comprises:
        unblocking write completions for writes from the master node to the cluster volume;
        sending a message from the master node to the slave node requesting that the slave node unblocks write completions for writes to the cluster volume.

5. The method of claim 2, wherein:
    switching to the second mirror comprises selecting the second mirror from a plurality of available mirrors;
    the master node selects the second mirror from the plurality of available mirrors and sends a message to the slave node indicating that the slave node should switch from the first mirror to the second mirror.

6. The method of claim 1, wherein:
    at least one of the first and second mirrors comprises storage space provisioned by a thin-provisioned array.

7. The method of claim 1, wherein:
    switching to the second mirror comprises periodically switching between the first and second mirrors to provide continuous incremental images of the cluster volume.

8. The method of claim 1, wherein:
    the first and second periods of time comprise predetermined fixed intervals of time.

9. The method of claim 1, wherein:
switching to the second mirror is triggered when the first mirror captures a predefined amount of data.

10. The method of claim 1, wherein:
switching to the second mirror is triggered by a command received from a process external to the parallel cluster.

11. The method of claim 1, further comprising:
capturing offset and length information for each write submitted to the first mirror;
after switching to the second mirror:
using the length and offset information to read the first incremental image from the first mirror;
using the first incremental image to provide an incremental backup of the cluster volume.

12. The method of claim 1, further comprising:
capturing offset and length information for each write submitted to the first mirror;
after switching to the second mirror:
using the length and offset information to read the first incremental image from the first mirror;
using the first incremental image to provide incremental replication of the cluster volume.

13. A system for creating incremental images of cluster volumes, the system comprising:
a cluster agent programmed to maintain a parallel cluster comprising a plurality of cluster nodes connected to a cluster volume;
a mirroring module programmed to:
create a first incremental image of the cluster volume by capturing changes to the cluster volume on a first mirror during a first period of time;
switch to a second mirror to create a second incremental image of the cluster volume by capturing changes to the cluster volume on the second mirror during a second period of time;
a consistency module programmed to, for each cluster node in the parallel cluster:
block write completions for writes to the cluster volume before the mirroring module switches to the second mirror;
unblock the write completions for writes to the cluster volume after the mirroring module switches to the second mirror;
at least one hardware processor configured to execute the cluster agent, the mirroring module, and the consistency module.

14. The system of claim 13, wherein the cluster agent is programmed to maintain the parallel cluster by:
selecting a first node in the parallel cluster as a master node;
configuring the master node to manage switching between the first and second mirrors;
designating a second node in the parallel cluster as a slave node.

15. The system of claim 14, wherein the consistency module is programmed to block write completions for writes to the cluster volume by:
configuring the master node to block write completions;
sending a message from the master node to the slave node requesting that the slave node configures itself to block write completions;
receiving a message from the slave node indicating that the slave node is configured to block write completions.

16. The system of claim 14, wherein:
the mirroring module is programmed to switch to the second mirror to create the second incremental image of the cluster volume by:
switching the master node to the second mirror;
sending a message from the master node to the slave node requesting that the slave node switches to the second mirror;
the consistency module is programmed to unblock the write completions for writes to the cluster volume by:
unblocking write completions for writes from the master node to the cluster volume;
sending a message from the master node to the slave node requesting that the slave node unblocks write completions for writes to the cluster volume.

17. The system of claim 13, wherein:
at least one of the first and second mirrors comprises storage space provisioned by a thin-provisioned array.

18. The system of claim 13, wherein:
the first and second periods of time comprise predetermined fixed intervals of time.

19. The system of claim 13, wherein switching to the second mirror is triggered by at least one of:
the first mirror capturing a predefined amount of data;
a command received from a process external to the parallel cluster.

20. A non-transitory computer-readable-storage medium comprising one or more computer-executable instructions that, when executed by at least one processor of a computing device, cause the computing device to:
maintain a parallel cluster comprising a plurality of cluster nodes connected to a cluster volume;
create a first incremental image of the cluster volume by capturing changes to the cluster volume on a first mirror during a first period of time;
for each cluster node in the parallel cluster, block write completions for writes to the cluster volume;
while the write completions are blocked, switch to a second mirror to create a second incremental image of the cluster volume by capturing changes to the cluster volume on the second mirror during a second period of time;
after switching to the second mirror, unblock the write completions for writes to the cluster volume.

* * * * *